Aug. 13, 1968     G. S. LAYNE ET AL     3,397,056
SEPARATION OF ALUMINUM FROM IMPURE ALUMINUM SOURCES
Filed Nov. 15, 1965
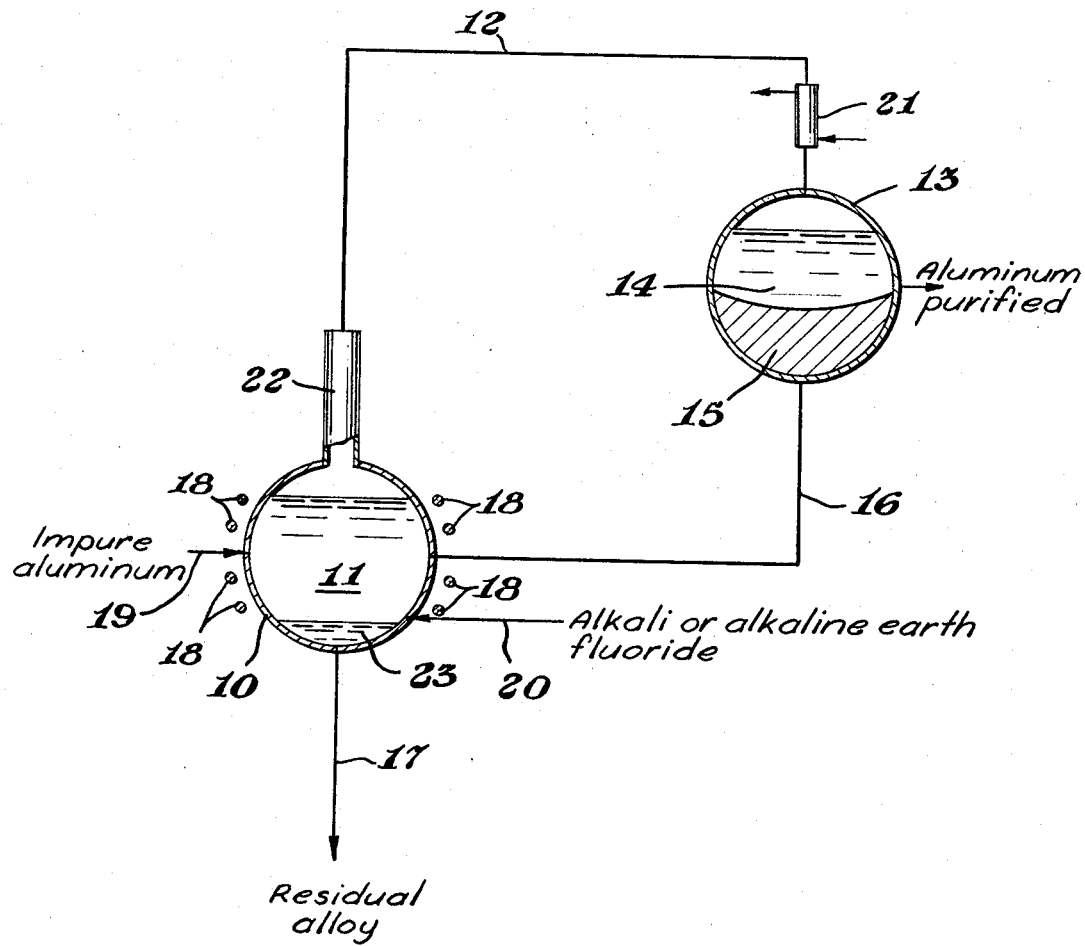
INVENTORS.
Gilbert S. Layne
James O. Huml
Raymond B. Pedler
ATTORNEY 3,397,056
SEPARATION OF ALUMINUM FROM IMPURE
ALUMINUM SOURCES
Gilbert S. Layne and James O. Huml, Midland, Mich., assignors to The Dow Chemical Company, Midland, Mich., a corporation of Delaware
Filed Nov. 15, 1965, Ser. No. 507,974
11 Claims. (Cl. 75—68)

This invention relates to an improved process for the separation of aluminum from its alloys and other impure sources, and is more particularly related to a process for the removal of aluminum in the vapor phase from impure aluminum and the recovery of said purified aluminum in the liquid phase.

A large quantity of impure aluminum is available in the form of scrap. Additional impure aluminum would be produced by the carbothermic reaction of carbon with bauxite and clays if a suitable method of purification of the aluminum thus produced was available. Such aluminum contains various metal impurities alloyed therewith such as iron, silicon, copper, titanium, manganese and the like. Previous attempts to recover aluminum in purified form from such impure sources has been expensive, unduly time consuming and generally ineffective in producing a high quality aluminum having a low impurity level. Such previous methods are exemplified by U.S. 2,184,705 wherein impure aluminum and a metal halide are mixed as solids, heated under vacuum to evolve aluminum monohalide vapors and such vapors are condensed as a solid mixture of purified aluminum and the metal halide. Such process has been generally unsatisfactory, however, due to the fact that contact is poor between the metal halide and the impure aluminum resulting in inadequate heat transfer and low yields. Additionally, the purified aluminum product contains significant amounts of contamination by the metal of the metal halide used in the process and such process is not effective in purifying aluminum containing a high percentage of impurities.

It is an object of this invention to provide an improved process for the refining of aluminum from impure sources thereof. It is an additional object of this invention to provide a process for removing aluminum values in the vapor phase from molten impure aluminum sources and recovering purified aluminum in the liquid phase. These and other objects and advantages of the present process will be found by a reading of the following specification.

It has now been discovered that aluminum may be recovered from its usual alloys and impure forms by heating in a reaction zone, at a pressure above about 100 mm. of mercury absolute, usually between about 100 mm. and 1000 mm. of mercury absolute, a mixture of such impure aluminum source and a molten metal fluoride selected from the group consisting of sodium fluoride, potassium fluoride, calcium fluoride and magnesium fluoride alone or in combination with aluminum fluoride to a temperature above the melting point of the mixture and below the boiling point of the lowest boiling reactant at the pressure employed. At these temperatures, gaseous products are formed. These vaporized products pass from the reactor and are condensed in a quiescent zone. The liquid aluminum phase is allowed to separate from the molten metal fluoride phase and at least the at Al phase is maintained in the liquid state. The phases are separated to produce a purified aluminum and metal fluoride which are substantially free from the impurities originally contained in the aluminum.

By the term "impure aluminum source" as used herein is meant any source of aluminum wherein aluminum is present as a major, i.e. significant constituent and which contains metallic impurities or decomposable aluminum compounds alloyed or mixed therewith, and which releases aluminum or decomposes to produce aluminum upon heating. Such materials include alloyed aluminum ingot, aluminum scrap, aluminum produced by the reaction of bauxite, clays or other aluminum-containing minerals with carbon, and decomposable compounds of aluminum such as aluminum carbide. The present invention finds particular utility in its ability to produce purified aluminum from highly impure aluminum sources which contain only 10–70 weight percent Al.

As metal fluoride adjuvants, sodium fluoride, potassium fluoride, calcium fluoride, or magnesium fluoride may be used, either alone, in combination with one another or in combination with aluminum fluoride in an amount, for example, of from about 1 to 30 percent by weight of such aluminum fluoride. In general, those fluorides with lower boiling points, e.g. potassium fluoride and sodium fluoride are preferably used in combination with a second metal fluoride to increase the boiling point, for example, the use of calcium fluoride with potassium fluoride raised the boiling point of the potassium fluoride sufficiently to render it more efficient in this process. It has been found that magnesium fluoride either employed alone or in combination with aluminum fluoride is particularly effective in this process and its use is therefore preferred.

The impure aluminum starting material is heated in a reaction zone with a metal fluoride as hereinbefore described. While there is no intention to be bound by any interpretation or theory, it is thought that the mechanism of this refining process involves reaction of the molten metal fluoride with the impure aluminum to produce both gaseous AlF and the free metal of the metal fluoride employed as a starting material. These products are vaporized as they are formed, pass from the reaction zone and are cooled. Upon cooling the reaction reverses to produce purified aluminum and a metal fluoride. For example, with aluminum and magnesium fluoride, the primary reaction is thought to be

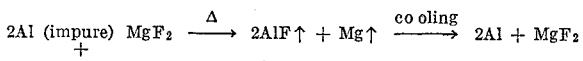

A secondary equilibrium reaction also occurs, however, which for aluminum and magnesium fluoride may be shown as

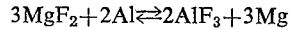

The presence of this secondary reaction accounts for the occurrence in the purified aluminum product of some metal impurity from the metal fluoride. In the reaction zone, $AlF_3$ and Mg from this secondary reaction account for about 5%–10% of the total volume of gas passing from the reactor, the remainder of the gas being that formed by the above-mentioned primary reaction. It has been found that if the gases from the reaction zone are rapidly cooled and solidified, a relatively high concentration of magnesium metal will be retained in the aluminum phase. If, however, the products are collected as liquids and the phase separation is allowed to occur at the lowest practical temperature at which at least the aluminum is still molten, a high purity aluminum is obtained which contains a relatively low content of magnesium. During the cooling in this particular manner, metallic magnesium present in the aluminum phase apparently reacts to form $MgF_2$. To obtain such relatively pure aluminum, it is desirable to cool the products until at least a portion of the metal fluoride salt phase has solidified while maintaining the aluminum phase as a liquid. The process of this invention thereby provides a method which reduces metal contamination in the aluminum to a minimum. A control of magnesium content in the aluminum is achieved by controlling the temperature of the two phases at the time of separation. A higher magnesium content, e.g. 0.5–1.0% by weight, is obtained when such separation is made at a higher temperature and a magnesium content of less than 0.005 may be achieved by separation at lower temperatures.

In order to achieve the advantages of this process, it is necessary that the vapor products, as shown above, are cooled so as to be in the liquid state and are allowed to separate into separate phases. Thereafter, and prior to removal of one of the layers or phases, it is desirable that at least the aluminum phase be maintained in the molten state until after separation. Preferably, the product is cooled to allow the metal fluoride to slowly form a solid phase while the aluminum phase remains liquid. This procedure assures a low metal contamination of the purified aluminum by the metal derived from the metal fluoride. Once the aluminum and the metal fluoride are separated, the metal fluoride may be recycled to the reaction zone and reused as an adjuvant. The metal impurities remaining behind in the reaction zone form a residual alloy which is periodically removed from the reaction zone. By the same process, magnesium fluoride, containing oxides or heavy metal impurities, may be purified by its inclusion as the metal fluoride salt herein.

The temperature of the reaction zone must be sufficiently high so that the metal halide will be molten and the aluminum monofluoride will distil from the reaction zone. It is usually advantageous to employ a temperature of from 100 to 200° C. higher than the formation temperature of the aluminum monofluoride at the pressure employed.

While reduced pressure is not necessary for the effective operation of this process, a pressure as low as 100 mm. of mercury may be employed if desired to lower the volatilization temperature of the AlF. A pressure at or near atmospheric is generally more convenient and preferred, however.

If scrap aluminum or other impure aluminum source is employed which contains volatile materials, e.g. relatively volatile metals such as Zn, cadmium and the like, it is necessary, of course, to first remove these impurities, for instance by heating the impure aluminum source to drive off such volatile impurities. Where the volatile materials are desirable alloying constituents, however, they need not be removed prior to treatment in this process.

The metal fluoride employed must be present in at least the stoichiometric amount necessary to convert the Al present to AlF if a high recovery of the aluminum is to be achieved. Amounts greater than stoichiometric may be employed but an excess of more than 100% becomes uneconomical.

Heating of the mixture of impure aluminum and the metal fluoride may be accomplished by known methods such as by internal heating with an electrical resistance or by external heating by induction.

The figure shows a schematic diagram of the process of this invention wherein reaction vessel 10 is heated inductively by coils 18. Impure aluminum is fed into the reactor vessel 10 through line 19 and metal fluoride is fed into the reactor vessel 10 through line 20. Gaseous aluminum monofluoride and the metal released from the metal fluoride are passed from the reactor vessel 10 through line 12 and into cooling section 21 where they are cooled sufficiently to cause liquefication and collection in vessel 13. Vessel 13 provides a quiescent zone wherein the molten aluminum layer 14 separates from molten metal fluoride layer 15. Both layers may be maintained in the liquid state and separated or the salt layer may be allowed to solidify and the Al layer removed as a liquid. A means 16 is provided for the return of the purified metal fluoride to the reaction zone for further use as an adjuvant. As additional purified aluminum is removed from the reaction zone 10, the metal impurities collect as a residual alloy in a layer 23 of the reaction zone. The residual alloy thus formed may be withdrawn from the reaction zone through line 17. This material is rich in metals other than aluminum and may be sold for the metal values therein or may be further separated.

If an even greater aluminum purity is desired in the product, a rectification section 22 may be provided between the reaction zone 10 and the cooling section 21. By employing such a rectification section, in combination with the step of allowing the salt phase to slowly solidify, aluminum of extremely high purity may be obtained.

It is desirable to exclude air from contact with the hot metals in this system. It is therefore desirable, prior to beginning the reaction, to fill the system with a gas, e.g. helium, argon, neon, etc. which is chemically inert to the reactants and products herein or to evacuate the system.

In order to provide ease in understanding, the following examples are set forth to illustrate and are not to be construed to limit the present invention.

Example 1

A graphite crucible was employed which was fitted with a five plate graphite condenser and a collector. The crucible was insulated with graphite felt and enclosed in a high temperature silica glass shell. To the crucible was added 72.5 grams of an impure aluminum alloy (containing 25 weight percent iron, 10 weight percent silicon, 3 weight percent titanium and 2 weight percent manganese, the balance being principally aluminum) and 55.0 grams of magnesium fluoride. The crucible was heated under 1 atmosphere of argon pressure to 1550° C. for 2 hours. During this reaction period, purified aluminum and magnesium fluoride were collected as liquid products and a residual alloy collected in the crucible. Spectrographic analysis of the aluminum product, after separation from the $MgF_2$, showed it to contain 0.024 weight percent Fe, 0.015 weight percent Mn, and 0.03 weight percent Si, and 0.005 weight percent Ti. The condensed salt phase contained $MgF_2$ with substantially no Fe, Mn, Si or Ti impurities.

Example 2

The process of Example 1 was repeated using the same equipment but employing an impure aluminum alloy containing 10 weight percent aluminum, 35 weight percent silicon, 25 weight percent titanium, 22 weight percent iron and 5 weight percent manganese. To 100.2 grams of this impure aluminum was added 70.0 grams of magnesium fluoride and the mixture was heated at 1600° C. for 1 hour. Spectrographic analysis of the aluminum layer of the product showed it to contain 0.054 weight percent Fe, 0.072 weight percent Si, 0.006 weight percent Ti, and 0.035 weight percent Mn. Analysis of the $MgF_2$ phase protecting the residual alloy in the reactor showed it to contain 2.1 weight percent $AlF_3$ and substantially no Fe, Mn, Si or Ti.

Example 3

The process of Example 1 was repeated on a larger scale and utilizing a gas diffusion barrier that permitted only gaseous products to pass and prevented any entrained liquid droplets or solid dust from entering the collector.

The impure aluminum alloy consisted of 65 weight percent Al, 14 weight percent Si, 11 weight percent Ti, 8 weight percent Fe, and 2 weight percent Mn. To 672 grams of this alloy was added 626 grams $MgF_2$ and 146 grams of $CaF_2$. The amount of $MgF_2$ in excess of the stoichiometric proportion and the $CaF_2$ were added to serve as a flux for the residual alloy. This mixture was heated and maintained at 1450° C. for 4 hours. Substantially all of the aluminum was transferred to the collector. Analysis of the purified aluminum by spectroscopic techniques showed it contained 0.004 weight percent Fe, 0.07 weight percent Si, <0.0025 weight percent Ti, 0.026 weight percent Mn and 0.0078 weight percent Mg. Direct chemical analyses of the product showed 99.99 percent Al.

Similar results are obtained when sodium fluoride or potassium fluoride are employed in the place of magnesium fluoride.

Example 4

In order to demonstrate the differences between the present invention and the processes described in U.S. 2,184,705 for the separation of aluminum from its alloys, the following experiment was conducted in accordance with the examples of such patent.

To a horizontal graphite tube was added a compressed solid mixture of 50 grams of 20 mesh commercial grade of aluminum (containing 0.076 weight percent Fe, 0.005 weight percent Si, 0.002 weight percent Mg, 0.0055 weight percent Ni, 0.004 weight percent Ti and 0.009 weight percent Cu) and 75 grams of $MgF_2$. The portion of the tube containing the reactants was heated in an electric furnace at 1120° C. for two hours at a pressure of 4 mm. of mercury. Vapors from such heated zone passed to the cooler end of the graphite tube and condensed as solids. A total of 19.75 grams of product was obtained during the period of heating. Particles of aluminum removed from the product section contained 2.35 percent by weight Mg.

Example 5

In order to further demonstrate the difference between the present invention and the prior art process of U.S. 2,184,705, particularly with regard to aluminum alloys containing relatively large amounts of impurities, the following experiment was conducted.

The process of Example 4 above was repeated using 76.9 grams of an alloy of aluminum containing 65 weight percent Al, 14 weight percent Si, 11 weight percent Ti, 8 weight percent Fe and 2 weight percent Mn mixed with 75 grams of $MgF_2$. This mixture was heated to 1120° C. for 2 hours at a pressure of 4 mm. of mercury. At the end of 2 hours, only 0.2 gram of total material had vaporized from the heated zone and collected in the cool zone.

Various modifications can be made in the present invention without departing from the spirit or scope thereof for it is understood that we limit ourselves only as defined in the appended claims.

We claim:

1. An improved process for the purification of an impure aluminum source which comprises
   (1) heating in a reaction zone at an absolute pressure above about 100 mm. of mercury a molten mixture of an impure aluminum source and a metal fluoride adjuvant selected from the group consisting of magnesium fluoride and mixtures of aluminum fluoride with at least one of sodium fluoride, potassium fluoride, calcium fluoride, and magnesium fluoride to a temperature of from the melting point of the metal fluoride adjuvant to the boiling point of the lowest boiling component introduced into the reaction mixture at the pressure employed to vaporize products therefrom,
   (2) condensing the vaporized products as liquids in a quiescent zone, and
   (3) allowing the liquid aluminum to coalesce into a phase discrete from the metal fluoride phase.

2. An improved process for the purification of an impure aluminum source which comprises
   (1) heating in a reaction zone at an absolute pressure above about 100 mm. of mercury, a molten mixture of said impure aluminum source and magnesium fluoride to a temperature between about 1265° C. and the boiling point of $MgF_2$ at the pressure employed,
   (2) condensing the vaporized products therefrom as liquids in a quiescent zone,
   (3) allowing the liquid aluminum to form a phase discrete from the liquid $MgF_2$ salt phase, and
   (4) maintaining at least the aluminum phase in the liquid state, separating the phases to produce a purified aluminum and magnesium fluoride.

3. An improved process for the purification of an impure aluminum source which comprises
   (1) heating in a reaction zone at an absolute pressure above 100 mm. of mercury, a mixture of impure aluminum source and magnesium fluoride to a temperature between the melting point of $MgF_2$ and the boiling point of $MgF_2$ at the pressure employed,
   (2) condensing the vaporized products therefrom as liquids into a quiescent zone,
   (3) allowing the liquid aluminum to form into a phase discrete from the liquid $MgF_2$ phase,
   (4) cooling the products so as to maintain the aluminum as a liquid and solidify the $MgF_2$ phase, and
   (5) separating the liquid aluminum phase from the solid $MgF_2$ phase.

4. The process of claim 2 wherein the $MgF_2$ is combined with 1 to 30 percent by weight of $AlF_3$.

5. The process of claim 3 wherein the $MgF_2$ is combined with from 1 to 30 percent by weight of $AlF_3$.

6. The process of claim 2 wherein the $MgF_2$ is combined with from 1 to 10 percent by weight of $AlF_3$.

7. The process of claim 3 wherein the $MgF_2$ is combined with from 1 to 10 percent by weight of $AlF_3$.

8. An improved process for the purification of an impure aluminum source which comprises
   (1) heating in a reaction zone at an absolute pressure of from about 400 to 1000 mm. of mercury, a molten mixture of impure aluminum source and magnesium fluoride combined with from 0 to 50 percent by weight of $AlF_3$ at a temperature between about 1350° C. to 1700° C.,
   (2) condensing the vaporized products therefrom into a quiescent zone,
   (3) allowing the liquid aluminum to form a phase discrete from the liquid $MgF_2$ salt phase,
   (4) maintaining at least the aluminum phase in the liquid state, and
   (5) separating the phases to produce purified aluminum.

9. The process of claim 8 wherein the liquid products are cooled so as to maintain the aluminum phase liquid when solidifying the salt phase.

10. A process for the removal of oxide and heavy metal contaminants from magnesium fluoride which comprises
   (1) heating in a reaction zone at an absolute pressure above about 100 mm. of mercury a molten mixture of an impure aluminum source and a magnesium fluoride containing said oxide or heavy metal impurities at a temperature of between about 1300 and 1750° C.,
   (2) condensing the vaporized products as liquids in a quiescent zone, and
   (3) allowing the magnesium fluoride phase to separate from the aluminum phase.

11. A process for the removal of oxide and heavy metal contaminants from magnesium fluoride which comprises
(1) heating in a reaction zone at an absolute pressure from about 100 to 1000 mm. of mercury absolute, a molten mixture of an impure aluminum source and a magnesium fluoride containing said oxide or heavy metal impurities at a temperature of between about 1300 and 1750° C.,
(2) condensing the vaporized products as liquids in a quiescent zone,
(3) allowing the magnesium fluoride phase to separate from the aluminum phase, and
(4) while maintaining at least the aluminum phase in the liquid state separating the phases to produce a purified magnesium fluoride.

References Cited

UNITED STATES PATENTS

| | | | |
|---|---|---|---|
| 2,184,705 | 12/1939 | Willmore | 75—68 |
| 2,470,305 | 5/1949 | Gross | 75—68 |
| 3,235,376 | 2/1966 | Hollingshead | 75—68 |

FOREIGN PATENTS

| | | |
|---|---|---|
| 635,318 | 4/1950 | Great Britain. |
| 719,058 | 11/1954 | Great Britain. |

HYLAND BIZOT, *Primary Examiner.*

H. W. TARRING, *Assistant Examiner.*